United States Patent
Sedrak

(10) Patent No.: US 6,931,800 B2
(45) Date of Patent: Aug. 23, 2005

(54) STRUCTURAL SUPPLEMENTAL RUBBER DAMPERS (SSRD)

(76) Inventor: Fayed S. Sedrak, 3650 South St., Suite 209, Lakewood, CA (US) 90712

( * ) Notice: Subject to any disclaimer, the term of this patent is extended or adjusted under 35 U.S.C. 154(b) by 0 days.

(21) Appl. No.: 10/375,662

(22) Filed: Feb. 28, 2003

(65) Prior Publication Data

US 2004/0168377 A1 Sep. 2, 2004

(51) Int. Cl.[7] ................................. E04H 9/02
(52) U.S. Cl. ....................................... 52/167.1
(58) Field of Search ............................ 52/167.3, 167.1, 52/167.7, 167.8

(56) References Cited

U.S. PATENT DOCUMENTS

| | | | | |
|---|---|---|---|---|
| 4,574,540 A | * | 3/1986 | Shiau | 52/167.8 |
| 4,727,695 A | * | 3/1988 | Kemeny | 52/167.8 |
| 4,942,703 A | * | 7/1990 | Nicolai | 52/167.7 |
| 5,946,866 A | * | 9/1999 | Weglewski et al. | 52/167.1 |
| 6,354,047 B1 | * | 3/2002 | Shimoda et al. | 52/167.1 |
| 6,438,905 B2 | * | 8/2002 | Constantinou | 52/167.3 |
| 2004/0074161 A1 | * | 4/2004 | Kasai et al. | 52/167.1 |

FOREIGN PATENT DOCUMENTS

JP 2000160683 A * 6/2000 ............. E04B/1/26

* cited by examiner

Primary Examiner—Leslie A. Braun
Assistant Examiner—A. Joseph Wujciak
(74) Attorney, Agent, or Firm—Marcia A. Devon

(57) ABSTRACT

The devices are classified as a passive Supplemental Damping Devices, and as the name indicates they are used to supplement and increase the damping in structures. Increasing the damping is a desirable property, because it improves and enhances the performance of the structures. The devices are intended to be non-gravity loads carrying devices and are made of High damping Rubber that is bonded to Steel, however, some of them are capable of carrying substantial amount of gravity loads, if needed, and can be designed even to carry more. They are placed within the Structure's frame to dissipate energy produced by Earthquakes, Wind, or any other similar hazard. Examples of the placement are on the top of Bracing members or Shear Walls, in the Bracing members themselves, at the intersection of Bracing members, or at the Joints of Beam to Column connections.

5 Claims, 7 Drawing Sheets

STRUCTURAL SUPPLEMENTAL RUBBER DAMPERS (SSRD)

BACKGROUND OF THE INVENTION (1) Field of Invention

This invention is related to structures and buildings classification. The invention is devices that are placed within the structures frame, such as buildings and bridges, to increase their overall damping, to improve their performance by dissipating part of the energy transferred to them from Earthquakes, Wind and/or similar hazards.

(2) Description of the Related Art

It is known that increasing the damping in a structure will result in improvement in the response and performance of the structure under earthquake vibration, wind forces or any hazard of similar nature. All structures have damping, which causes them to stop vibrating. This damping is the result of internal factors such as the damping of the material of the structure, the movement in the connections or external factors such as the air resistance. The typical damping in a structure can approximately vary between 2 to 7% in the fundamental mode of vibration. With the supplemental dampers, the damping can be increased substantially to a desirable value of 15 to 25% or more in the fundamental mode of vibration. Those increases in the damping improve the performance of the structures, such as reduction in the side sway, reduction in the base shear and ultimately the reduction in the stress in the structural members and connections. At the same time the structures are build the same traditional way with the structures being supported by a regular foundations system.

This invention is made of Rubber or Rubber like material that is attached or bonded to Steel or steel like material and is placed on the top of the structure's bracing or shear walls. It can be also placed in the intersection of the bracing members or as part of the bracing members themselves. It is non-gravity load carrying device. However, it can be designed to be load bearing when it is placed for example on the top of shear walls.

Currently, there are several types of passive supplemental dampers; none of them use Rubber as the energy dissipating material. Those dampers are Friction dampers, Viscoelastic dampers, yielding metal dampers, Fluid viscous dampers. The friction dampers dissipate energy as a result of the friction between two metal surfaces, and have the disadvantage of deterioration when the friction surfaces deteriorate with the repeated use and time. Viscoelastic damper performance deteriorates with the changes in temperature and large strains. Yielding metal dampers dissipate energy due to the nonlinear deformation in the metal after yielding, it has the disadvantage of having residual strain in the metal due to the yielding, which make it less efficient or it might fail due to the repeated yielding and residual strains. Fluid viscous dampers have the disadvantage of being too expensive and the fluids might leak during the long life of the structures.

Another technology, which uses Rubber, is Base Isolators, which are placed between the structure and its foundations to separate the structure from the earthquake vibration. Isolators are also placed in other places in the structure to isolate sensitive equipment from their bases. The Base Isolators carry the weight of the structure and that is very serious drawback, which limits its use to smaller structures only. It requires back up system to carry the structure if the Base Isolator fails. The Base Isolators require periodic testing and maintenance. This is a serious disadvantage because of the long life of the structures. Frequently, many structures change owners and/or use. In many cases the structure's drawings are lost and the designer or the contractor could not be located, which poses a serious risk because of the needed inspection and maintenance. The Base Isolators cause large movement between the foundation and the structure under earthquakes vibration and wind forces, this is a big disadvantage because it requires many components of the structure to be designed to accommodate that movements. All of those disadvantages have limited the use of Base Isolators. It is most frequently used for retrofitting and upgrading of existing structures.

The Isolators technology is completely different from the supplemental damper technology. The Isolators as the name indicate serves to isolate the structure or the sensitive equipment from the vibration. The supplemental dampers on the other hand, as the name implies serves to supplement and increase the damping in the structure and at same time it doesn't cause the undesirable relative movement as in the case in the Isolators.

BRIEF SUMMARY OF THE INVENTION

This device is made of Rubber (Preferably High Damping Rubber) or any other similar material. That Rubber is bonded to Steel or any other similar material. The steel is to connect the device to the structure frame and the Rubber is to increase the damping in the structure and intern to dissipate energy. The device is designed to solve the many problems and drawbacks associated with the other devices. The device has many advantages, which includes the low cost, long life that lasts for the life of the structure without maintenance, not affected by the changes in temperatures, it doesn't fail under increased strains and its performance is not affected by repeated and frequent vibration. It will not cause relative movement between the different parts of the structure such as that produced by the Base Isolators or the other Isolators. The devices can be manufactured to be over the shelf item, where, different sizes of the device and types of rubber or similar materials can be pre-manufactured. The structure designer can select what is needed from a catalog of a variety, of already available devices. This will substantially reduce the time and cost of the construction.

Those devices will increase the overall damping in the structure and will dissipate part of the energy produced by Earthquakes, Wind, or any other hazard of a similar nature. It will make the structure cheaper to build and safer. One or more of these devices are to be placed within the structure's frame in specific locations, which are to be determined by the structure's designer. Many details and configuration of this invention can be made. This is to include but is not limited to devices that are placed on the top of Bracing members or Shear Walls, in the Bracing members themselves, at the intersection of Bracing members, and at the Joints of Beam to Column connections.

BRIEF DESCRIPTION OF THE SEVERAL VIEWS OF DRAWING

DETAILED DESCRIPTION OF THE INVENTION

Figure 1:
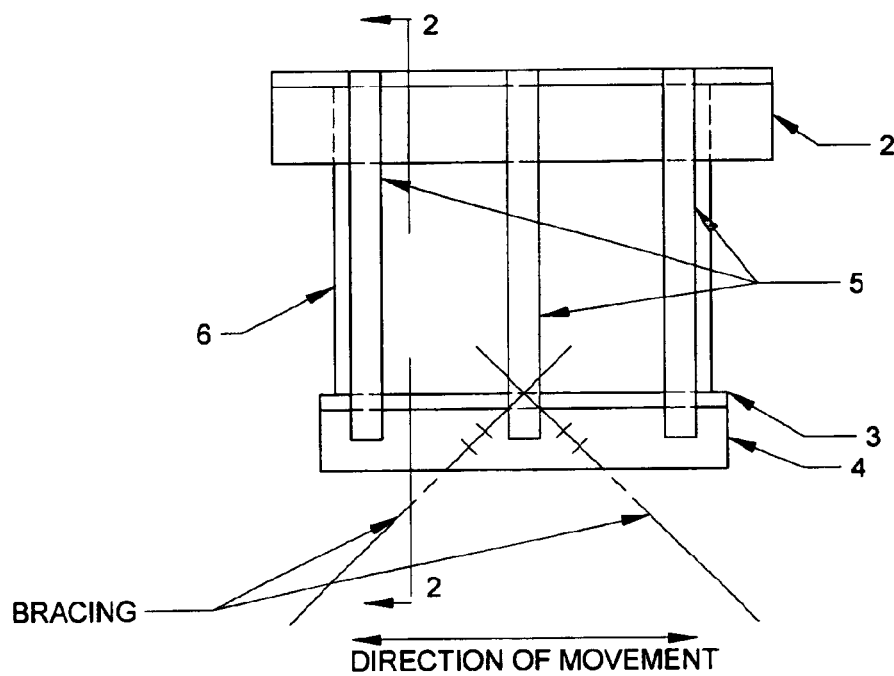
FIG. 1 Shows a Supplemental Rubber Damper (SRD) that can be used above the frame's bracing.
Figure 2:
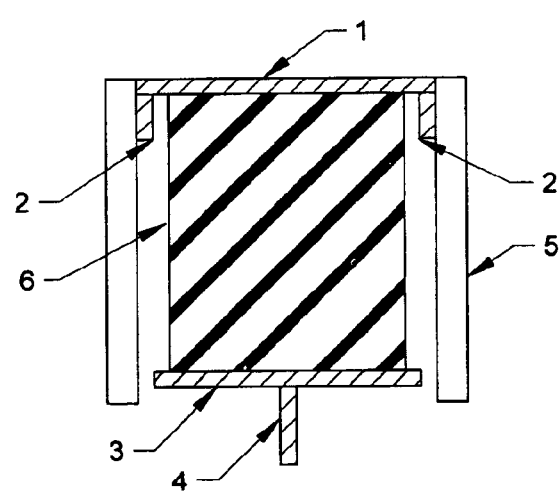
FIG. 2 Shows section 2—2 that is made in FIG. 1.
Figure 13:
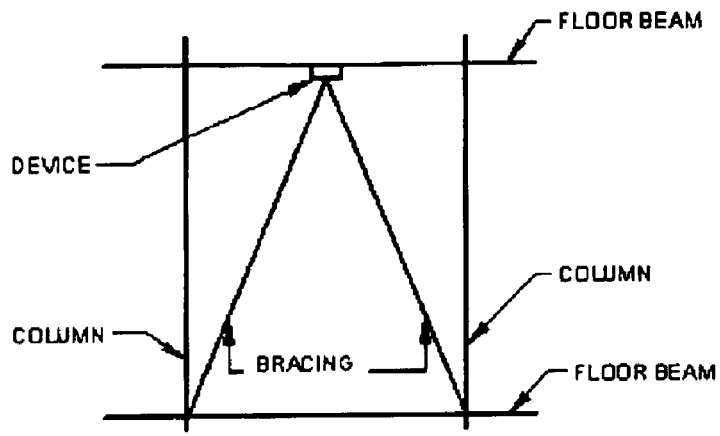
FIG. 13 shows device connected to bracing and floor beam.
Figure 14:
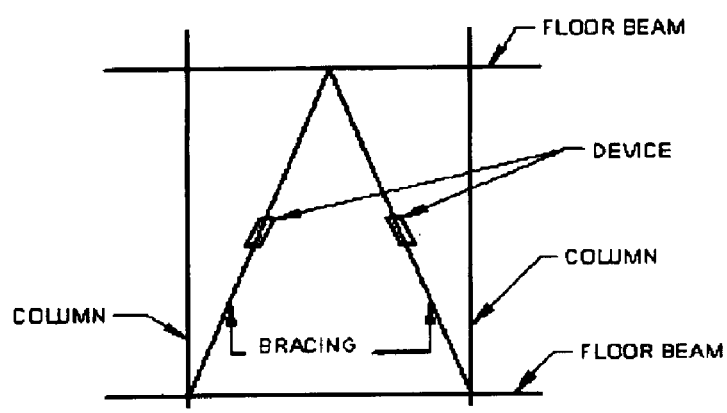
FIG. 14 shows the device is mounted on the bracing.

The Supplemental Rubber Damper (SRD), shown in FIG. 1, is a non load bearing device that is made of high damping rubber 6, and is bonded to mounting steel plate 1. Stiffener plates 2 are used to strengthen plate 1 and steel plate 3 is bonded to the bottom of the rubber 6. Gusset steel plate 4 is attached to plate 3. Plate 1 is used to attach the device to the bottom of the structure's beam, and plate 4 is used to attach the device to the structure's bracing. The SRD is placed in the structure's frame to dissipate energy from earthquakes, wind, or other hazards of a similar nature. The SRD is to be placed in specific locations in the structure's frame as shown in FIGS. 13 and 14. The structure should be designed and to the forces and stresses that will be applicable to the structure detailed, so that the SRDs can be placed to counteract the forces Steel plates 5 are welded to plate 1 and placed to prevent plate 3, plate 4, and the structure's bracing from moving in the lateral direction. At the same time it allows plate 3 to move in the longitudinal direction shown on FIG. 1 as the direction of movement. Teflon or other material is to be applied to reduce or eliminate the friction between plate 3 and plates 5. This Teflon or other friction reducing or eliminating material is applied at the locations where the friction is expected to occur between plate 3 and plates structure's bracing from moving in the lateral direction, such as bracing plate 3 to the floor framing with hinged connections that allow the relative movement between plate 1 and plate 3 in the direction of movement.

Figure 3:
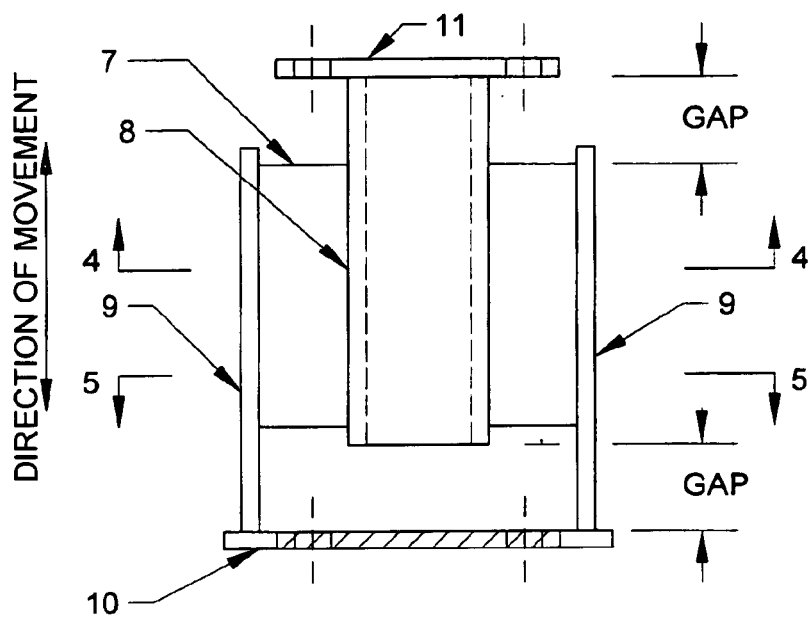
FIG. 3 Shows section 3—3 that is made in FIG. 5 and is called Bracing Rubber Damper (BRD) that is used as part of Bracing member.
Figure 4:
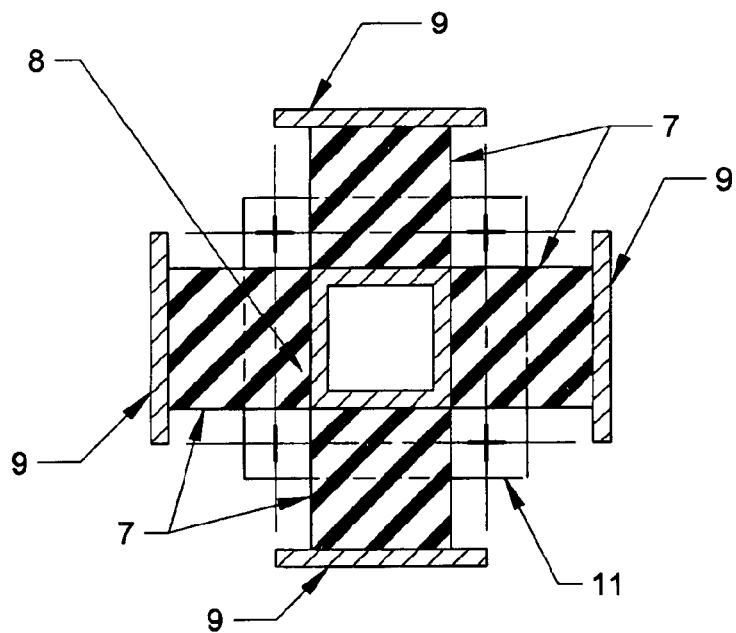
FIG. 4 Shows Section 4—4 that is made in FIG. 3.
Figure 5:
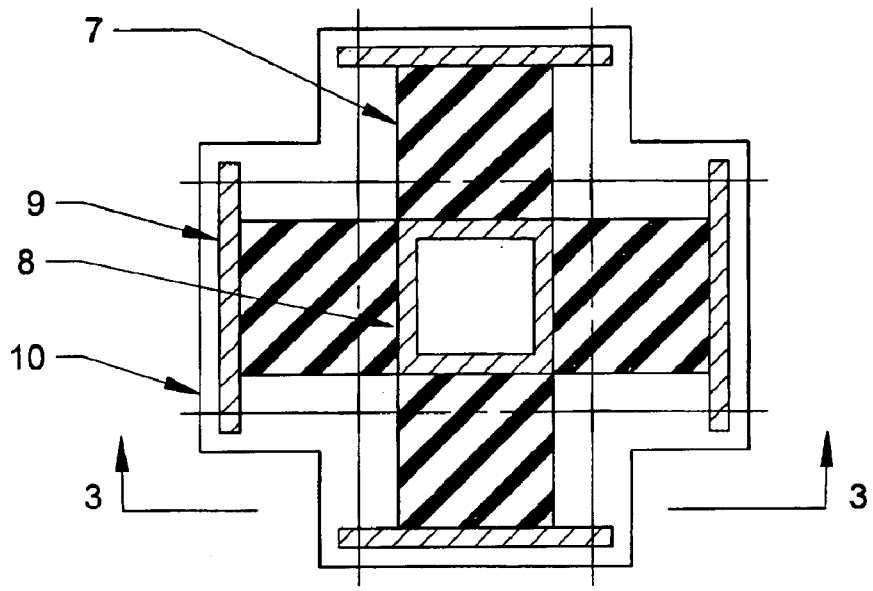
FIG. 5 Shows section 5—5 that is made in FIG. 3.

The Supplemental Rubber Damper (SRD) shown in FIG. 3 is placed as part of the Bracing of the structure to dissipate energy from earthquakes, wind, or any other hazard of similar nature. The device is made of high damping rubber material 7 that is bonded in both sides to steel plates or steel tube 8 and steel plate 9. Mounting steel plates 10 and 11 are connected to the ends of plates 8 and 9, respectively, as shown in FIG. 3. Steel plates 8 can be made of a part of a steel tube. Enough gaps should be available at both ends, as shown in FIG. 3, to allow for the relative movement between plates 10 and 11 in the direction of movement shown on FIG. 3.

Figure 6:
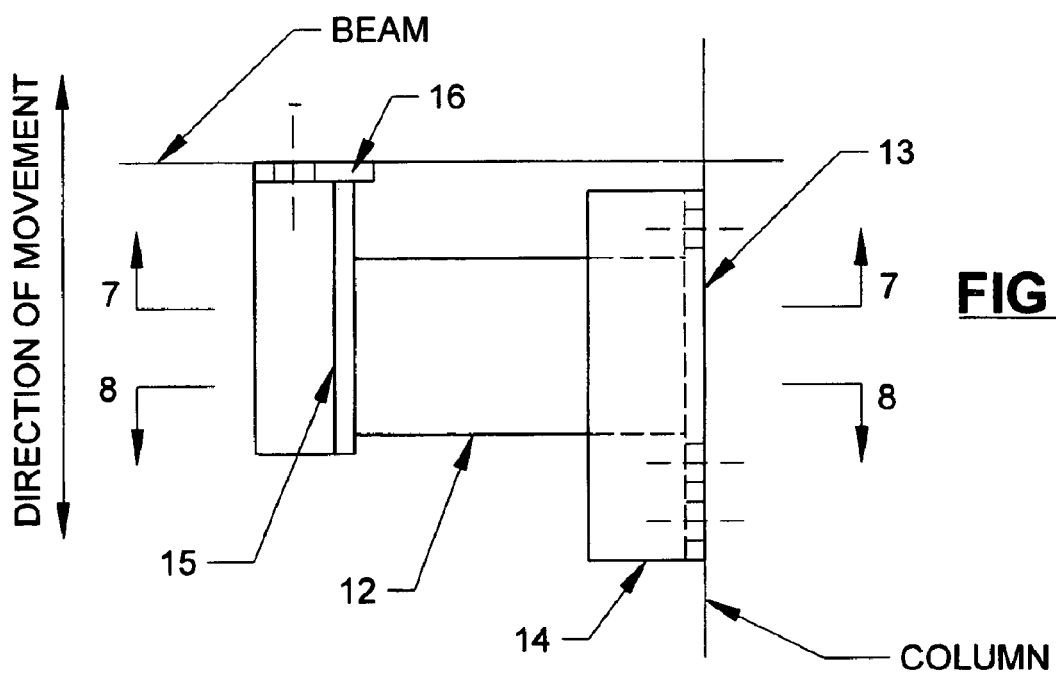
FIG. 6 Shows Joint Rubber Supplemental Damper (JSD) that is used in the Joints of Beam to Column Connections.
Figure 7:
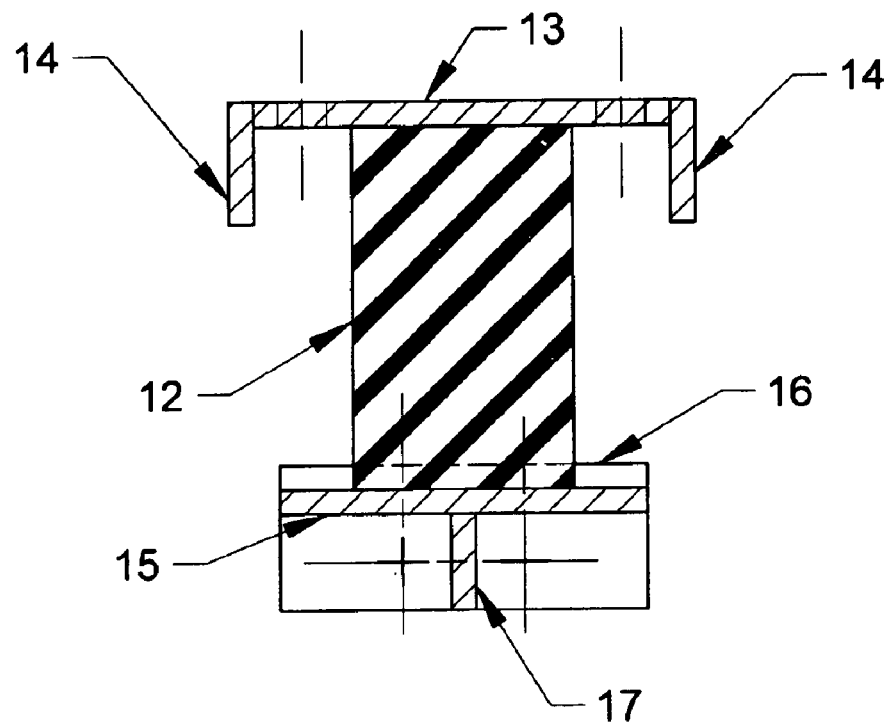
FIG. 7 Shows section 7—7 that is made in FIG. 6.
Figure 8:
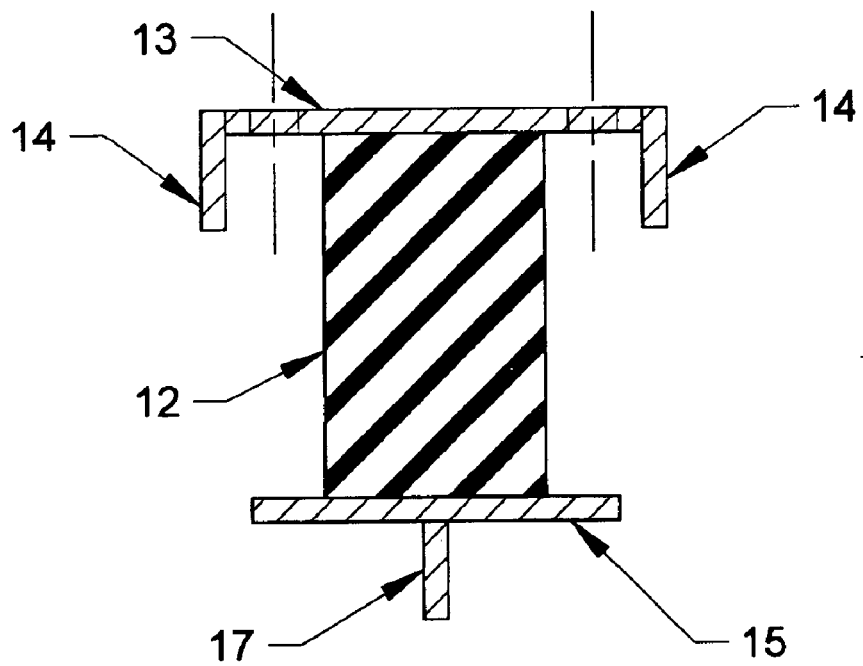
FIG. 8 Shows section 8—8 that is made in FIG. 6.

The Supplemental Rubber Damper (SRD) shown in FIG. 6 is to be placed at the joints of beam to column to dissipate the energy from Earthquakes, Wind, or any other similar hazards. The device is made of High Damping Rubber material 12 that is bonded to mounting steel plates 13 and steel plate 15. Plate 13 is to connect the device to the column of the joint. Plate 15 is connected to mounting plate 16, which is used to connect the device to the beam of the joint.

Stiffener steel plate 17 is placed to stiffen plates 15 and 16. Stiffener steel plate 14 is placed to strengthen plate 13.

Figure 9:
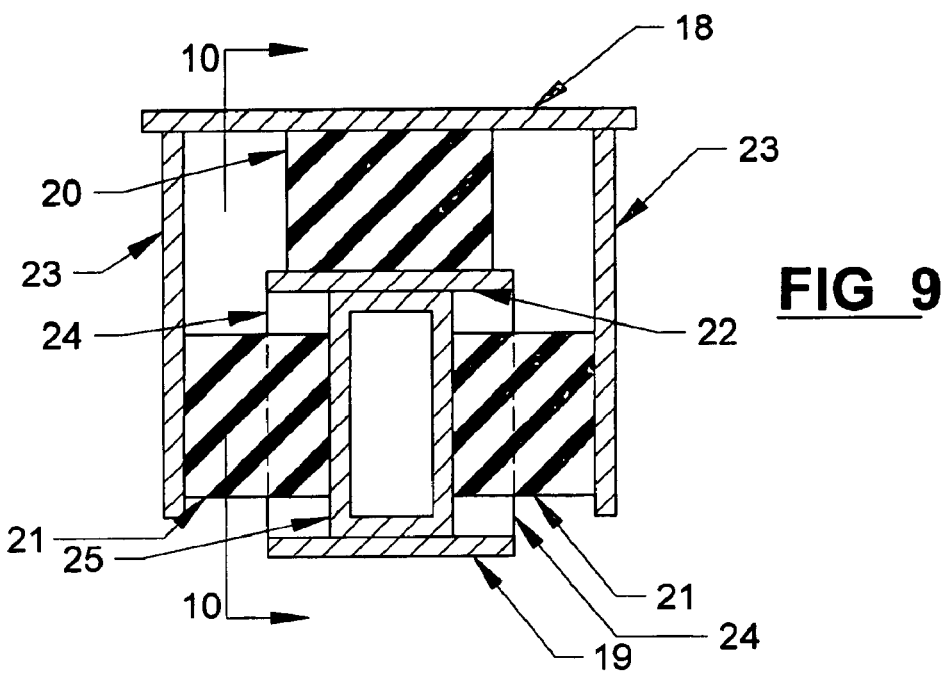
FIG. 9 Shows section 9—9 that is made in FIG. 10, It shows Rubber Supplemental Damper (RSD) that can be used above the frame's bracing or on the top of Shear wall FIG. 10 Shows section 10—10 that is made in FIG. 9.

The Supplemental Rubber Damper (SRD), shown in FIG. 9, is also non-load-bearing device. It is made of rubber 20 that is bonded to mounting steel plate 18 and steel plate 22, and rubber 21 that is bonded to steel plates 23 and steel tube or connected steel plates 25. The depth of rubber 20 is equal to the depth of rubber 21. Steel plate 18 is used to attach the device to the bottom of the structure's beam. Mounting steel plate 19 is used to attach the device to the top of the structure's bracing or the top of a shear wall. The device moves in the direction of movement indicated on the drawings when the structure is subject to earthquakes, wind, or any other hazard of a similar nature. Stiffener steel plate 24 is used to strengthen steel 25 in the lateral direction.

Figure 10:
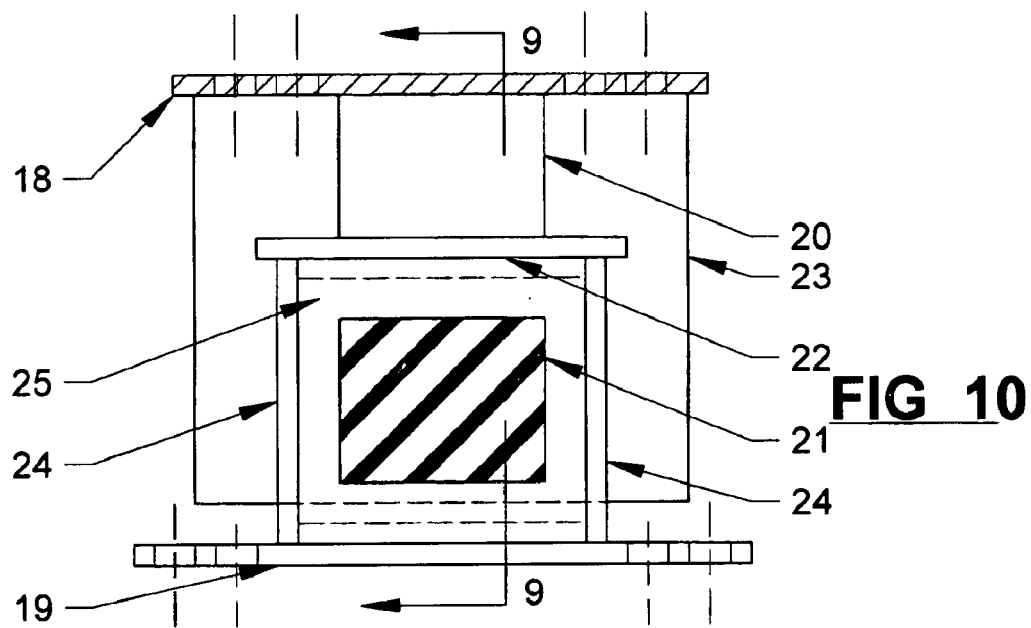
Figure 11:
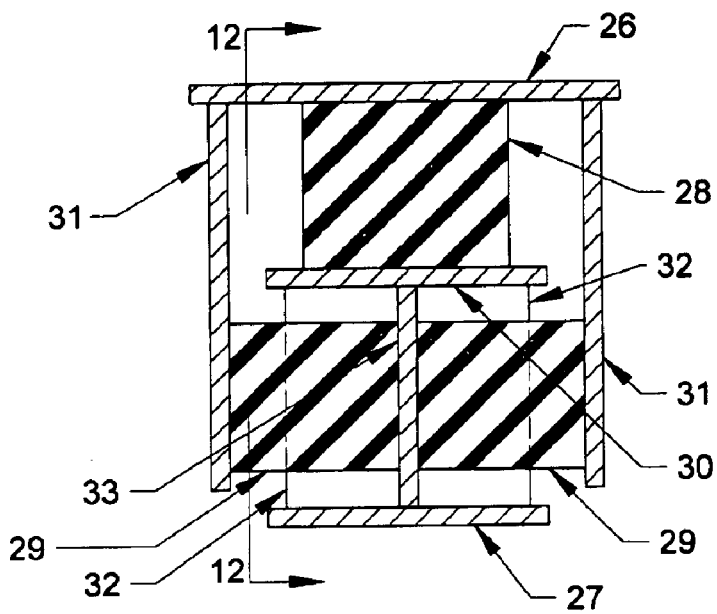
FIG. 11 Shows section 11—11 that is made in FIG. 12. It shows another detail that is similar to FIG. 9.
Figure 12:
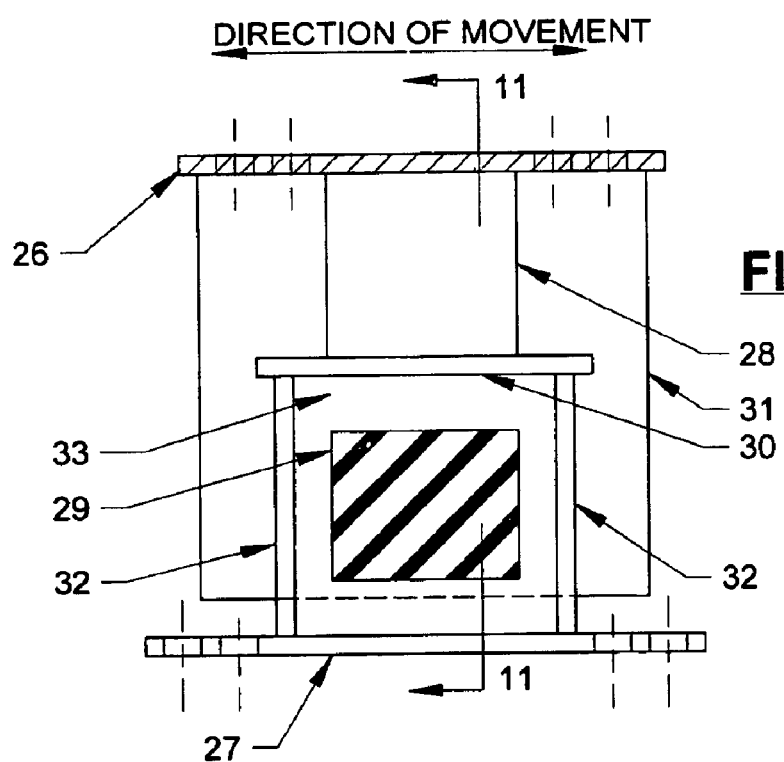
FIG. 12 Shows Section 12—12 that is made in FIG. 11.

FIG. 11 and FIG. 12 is similar to FIG. 9 and FIG. 10 respectively, but part 25 is replaced by part 33. Parts 27, 30, and 33 can be replaced with steel shape if appropriate. In FIG. 11 and FIG. 12 the parts 26, 27, 28, 29, 30, 31, and 32 are identical in description to parts 18, 19, 20, 21, 22, 23, and 24 respectively.

The high damping rubber material can be substituted with another material of similar, appropriate properties. The rubber material can be either solid blocks or thin sheets of rubber that are connected by other appropriate mechanical or bonding means in the appropriate locations. The device can be made of several parts; the parts are then bolted together, or connected together by any appropriate method. The word rubber may be substituted for the words high damping rubber anywhere in the entire specifications. The steel material can be substituted with another material of similar, appropriate properties. A variety of dimensions can be used for the devices. Different details of the devices using the same principles can be detailed to dissipate the energy in structures. Numerous numbers of details can be generated for the device, and numerous placement locations can be utilized using the same principles of high damping rubber or another material of similar properties, and placed within the structure's frame. The device is not intended to carry the full loads of the building, however, some embodiments of the device are capable of carrying significant gravity loads and can de modified to carry even more. Polymer composites with added reinforcement can be used instead of the rubber to increase the strength. To produce a device with larger capacity, or for any other purpose as needed, two or more devices can be connected together by bolting the appropriate parts of the devices together, or by connecting them using any other appropriate method. As many devices as needed are placed in the structure, depending on the size of the structure, type of hazards expected, and the requirement of the design.

I claim:

1. A damper for insertion between the interior beams and columns of a building comprising:

a first plate affixed to the beam and a second plate affixed to the column;

a viscoelastic material interposed between said first plate and said second plate;

a third and fourth plate parallel to each other, said third plate projecting perpendicularly from the end of said first plate and adapted to be affixed to the interior beam of said building, said fourth plate affixed to said second plate; and wherein said viscoelastic material is interposed between, and bonded to, said third and fourth plates.

2. The damper of claim 1 further including a plurality of restriction plates projecting perpendicularly from, and affixed to, said first plate.

3. The damper of claim 1 further including bracing affixed to said second plate.

4. The damper of claim 1 further including a gusset plate projecting perpendicularly from said first plate.

5. A damper for insertion into the interior beams of a building, said beams including floor beams, vertical columns and cross-bracing, said damper comprising:

a first plate affixed to the floor beam and a second plate affixed to the cross-bracing;

a third plate parallel to said first and second plates;

a viscoelastic material interposed between said first and third plates;

a tube interposed between said third plate and said second plate; and a fourth and a fifth plate projecting perpendicularly from and on opposite ends of said first plate;

a viscoelastic material interposed between said fourth plate and said tube; and a viscoelastic material interposed between said fifth plate and said tube.

* * * * *